Aug. 4, 1953 C. H. SCOTT 2,647,631

RAKING CLASSIFIER

Original Filed April 20, 1949 9 Sheets-Sheet 1

INVENTOR:
CHARLES HAROLD SCOTT,
BY
Arthur Middleton
ATTORNEY

INVENTOR:
CHARLES HAROLD SCOTT,
BY
Arthur Middleton
ATTORNEY

RAKING CLASSIFIER

Original Filed April 20, 1949

INVENTOR:
CHARLES HAROLD SCOTT,
BY
Arthur Middleton
ATTORNEY

Aug. 4, 1953 C. H. SCOTT 2,647,631

RAKING CLASSIFIER

Original Filed April 20, 1949 9 Sheets-Sheet 4

INVENTOR:
CHARLES HAROLD SCOTT,
BY
Arthur Middleton
ATTORNEY

INVENTOR:
CHARLES HAROLD SCOTT,
BY
Arthur Middleton
ATTORNEY

Aug. 4, 1953 C. H. SCOTT 2,647,631

RAKING CLASSIFIER

Original Filed April 20, 1949 9 Sheets-Sheet 6

INVENTOR:
CHARLES HAROLD SCOTT,
BY
Arthur Middleton
ATTORNEY

INVENTOR:
CHARLES HAROLD SCOTT,
BY
Austin Middleton
ATTORNEY

RAKING CLASSIFIER

Original Filed April 20, 1949 9 Sheets-Sheet 8

INVENTOR:
CHARLES HAROLD SCOTT,
BY
Arthur Middleton
ATTORNEY

RAKING CLASSIFIER

Original Filed April 20, 1949 9 Sheets-Sheet 9

INVENTOR:
CHARLES HAROLD SCOTT,
BY Antun Middleton
ATTORNEY

UNITED STATES PATENT OFFICE 2,647,631

RAKING CLASSIFIER

Charles Harold Scott, South Norwalk, Conn., assignor to The Dorr Company, Stamford, Conn., a corporation of Delaware Continuation of application Serial No. 88,619, April 20, 1949. This application December 28, 1951, Serial No. 263,892

23 Claims. (Cl. 209—462)

This invention relates to classifiers of the reciprocating rake type adapted to treat a bath of suspended solids for the purpose of fractionating the solids according to size so that an overflow contains suspended solids below a certain or predetermined size called fines, while the fraction of larger sized solids are progressively emerged and delivered from the classifier as sands. Such classifiers comprise a tank having an inclined bottom or deck along which longitudinally-extending rake structures are adapted to have reciprocating strokes imparted to them. During a stroke up along the inclined deck, settled solids are conveyed by the rakes. To that end the rake structures are lowermost and adjacent the deck during up-deck strokes and are uppermost and away from the deck during down-deck strokes. Thus, the rake structures are adapted to be raised and lowered during the transition between strokes.

So the general problem in the design of such a classifier is to devise an acceptable and satisfactory drive for moving the raking blades upwardly along the inclined bottom of the tank, raising the raking blades, moving them through a return stroke while elevated from the tank bottom, descending the blades to the tank bottom, and then through their upward stroke again.

One such drive arrangement is shown in Patent No. 2,437,760 granted March 16, 1948, to Frank L. Graner and the present applicant, application for which was filed on April 14, 1945, and was accorded Serial No. 588,360. In that patent there is shown a shaft extending longitudinally of the tank and mounted from the tank for rocking or oscillating about its longitudinal axis with a dwell between each stroke. This rockable or oscillant shaft is provided with cross-arms pivotally mounted on the shaft and spaced apart longitudinally along the shaft. With this arrangement, means are provided for rocking the shaft and meanwhile moving the cross-arms about their pivots. The free ends of the cross-arms are provided with hangers which support a rake structure from the free ends of the arms on one side of the rockable shaft and another rake structure from the free ends on the other side. The arrangement is such that when one rake structure is moving adjacent the tank bottom on an up-stroke, the other rake structure is elevated and is passing through its return stroke.

The pivoted cross-arms of the rockable shaft present difficulties in devising dependable motivating means, so it is an object of this invention to make use of the rockable shaft but to fix the cross-arms on that shaft so that they are not pivoted and then provide new and novel means for supporting the rake structures from the non-pivoted arms as well as new and novel means for reciprocating the rake structures from these arms.

A feature of the present invention relates to the introduction of longitudinally-extending slideway constructions positioned between the outer ends of the arms and the hangers for the rake structures. This slideway construction is preferably of a character which while supporting the hangers for longitudinal reciprocation permits them to have slight angular movement about a longitudinally-extending pintle axis as the rockable arms are raised and lowered.

Another object is to devise a satisfactory drive-head construction for accomplishing both the rocking movement of the shaft and its fixed cross-arms as well as the proper longitudinal reciprocable movements of the rake structure. The drive-head embodies a rotary mechanism of a composite type for converting its rotary motion into (1) the rocking motion of the rockable shaft and (2) the reciprocating motion of the rake structures.

A further object of the invention is to devise connecting means between the fixed cross-arms and the rake structure hung therefrom so that the rake structures can be reciprocated while they are supported from the cross-arms that rock unitarily with the rockable shaft and yet which may be held relatively stationary for a particular interval of time. Thus, the general problem of the design of such a classifier is to devise an acceptable and satisfactory drive for moving each rake structure cyclically forward along the inclined bottom of the tank; raising such structure while in its forward position, moving such raised structure through a return stroke elevated from the tank bottom to a rearward position, and lastly, lowering the rake structure to the tank bottom preparatory to its starting position preparatory to its next forward raking stroke of the next cycle. The pair of rake structures hung from the rockable shaft operate in balanced relationship, namely, when one is in forward raised position, the other is in lowered rearward position, and vice versa.

In such a classifier it is advantageous, particularly at a time of abnormal overload of feed to the classifier, or of starting up of the loaded classifier after a period of rest, to make provision for lifting the rear portion of the rockable shaft and its rake structures from the normal low positions. To satisfy such requirement, a construction has been designed whereby the forward end of the rockable shaft is mounted for limited pivotal movement about a transversely-extending axis and at the same time the rear end of the shaft can be elevated should operating requirements make that desirable. The novelty of the new construction resides in the details whereby this is accomplished.

Some of the features of this invention include: (1) The rockable shaft with its straight parallelly extending guideways located at the outer ends of the cross-arms fixed on the shaft, from which guideways there are supported depending hangers for the rake structures whereby as the rake structures are longitudinally moved, they travel in straight paths paralleling the axis of the rockable shaft; (2) a novel form of drive-head mechanism; (3) a novel mounting of the drive-head mechanism with respect to the tank and a novel mode of employing that mechanism for supporting the rockable shaft; and (4) the drive-head mechanism with a housing or cage supported for limited movement about an axis transverse to the classifier and provided with a bearing for the forward end of the rockable shaft located so that the axis of the shaft is higher than the axis of the drive mechanism.

The foregoing and several novel features of construction are embodied in the new form of apparatus constituting the basis of the invention hereof. Other new and important features of construction will be manifest from the detailed description which follows:

There is herein disclosed the best embodiment of the invention now known to me and that embodiment has been chosen for the purpose of illustration of the invention hereof. It will be described precisely without attempt to refer to modifications or equivalents which, however, can be used while still falling within the ambit of this invention. The nucleus and bounds of this invention are set forth in the appending claims but possibly in less precise language than that employed in the body of the specification.

The embodiment chosen for use in exemplification is illustrated in the accompanying drawings constituting a part of this specification, in which:

Fig. 1 is a plan view of a classifier embodying the invention hereof.

Figs. 2ª and 2ᵇ when brought into alignment collectively provide a vertical longitudinal sectional view of the classifier as the same appears when taken on a vertical plane indicated by the dot and dash line 2—2 of Fig. 1, looking in the direction of the arrows. The deep end of the classifier is the rear overflow portion thereof while the shallow end is the front or sands-discharge portion thereof.

In Figs. 3 and 4 certain parts of the housing of the drive-head have been broken away so that certain features of construction adapted therefor may be indicated.

Figures 5, 6, 7, 8, 9, 10:
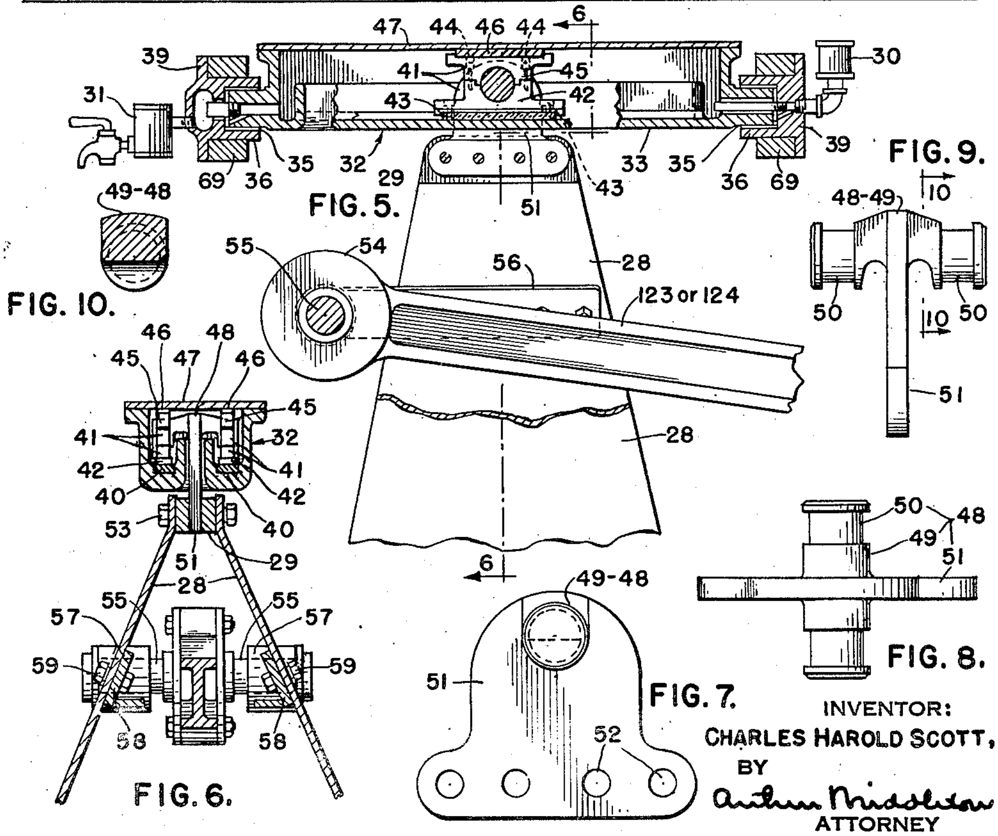
Fig. 5 is a longitudinal view, partially in section, of a slideway construction which is employed at the outer end at each set of arms connected to and extending from the rockable shaft. This view also shows a portion of a depending member of the slideway construction by and from which a section of the rake structure derives longitudinal slidable support from a set of rocker arms.
Fig. 6 is a transverse sectional view taken on vertical plane indicated by the broken dot and dash line 6—6 of Fig. 5, looking in the direction of the arrows.

Figs. 7 to 10 inclusive are detailed views of a depending member that is included in the slideway construction of Figs. 5 and 6 and from which the rake structure derives carrying support. Of the figures just mentioned, Fig. 10 is a cross-sectional view taken on a vertical plane indicated by the dot and dash line 10—10 of Fig. 9.

Figure 11:
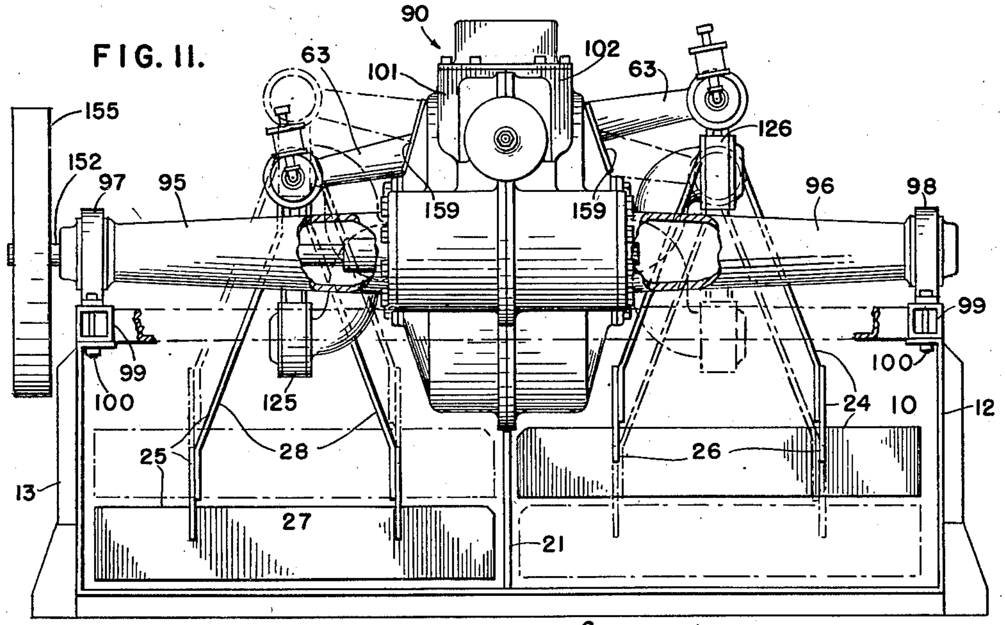

Fig. 11 is a front elevational view partially in section and of which certain parts have been broken away.

Figs. $12^a$, $12^b$ and $12^c$ collectively constitute a longitudinally- and transversely-extending sectional view of the drive head. This is a view taken as on a plane indicated by the dot and dash line 12—12 of Fig. $2^b$ or by dot and dash line 12—12 of Fig. 13.

Fig. $12^a$ shows an outer broken off portion of a support tube of $12^b$.

Fig. $12^c$ illustrates the rear end of a drive link of which the forward end is mounted on the outer end of a crank arm of $12^b$ and of which link the rear end is mounted on a wrist pin on a rake structure to which the link corresponds.

Figures 13, 14, 15:
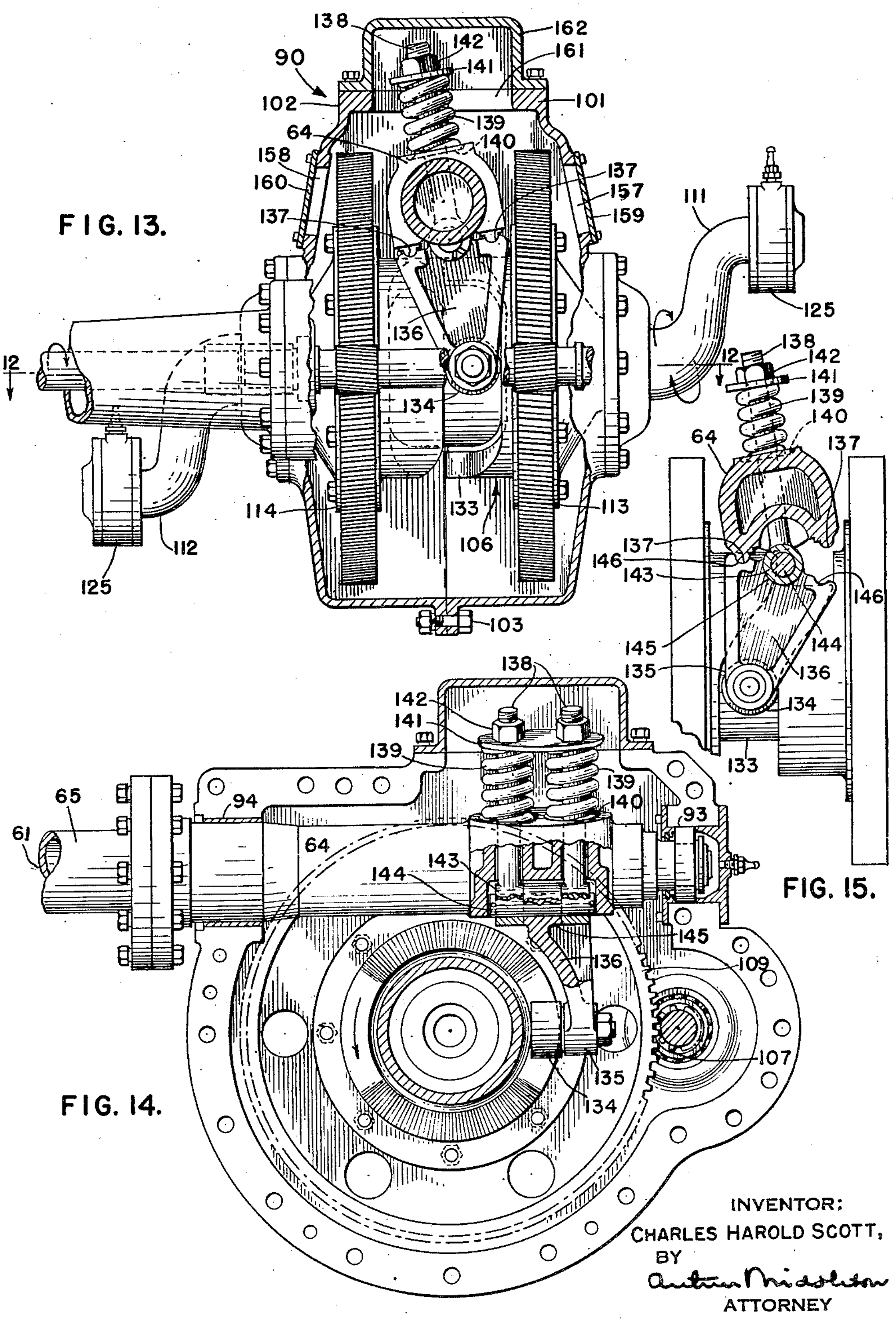

Fig. 13 is a vertical view of the drive-head looking in a rearward direction toward the front of the classifier. In this view some of the parts of the housing structure and of the mechanism of the drive-head are broken away to show more clearly the arrangement of certain movable parts constituting the assembly of coordinated actuated members of the drive-head.

Fig. 14 is a vertical longitudinal sectional view illustrating portions of the drive-head and while at the same time indicating the location of forward supporting bearings provided for receiving the front end of the rockable or oscillant shaft of the tiltable rocker.

Fig. 15 is a detail indicating how a roller-carrying arm which is connected to the front end of the rockable shaft can yield or "break" upon abnormal conditions being encountered by the shaft or by the parts carried therefrom.

Figure 16:
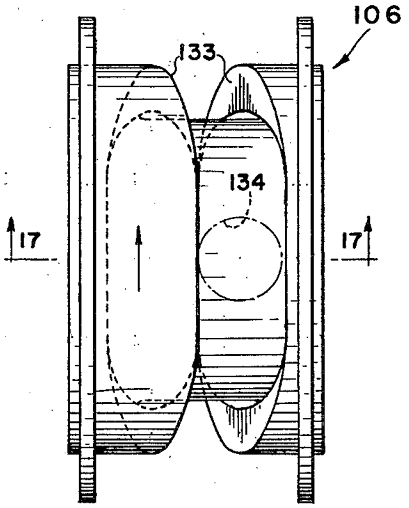

Fig. 16 is a view looking rearwardly at a turnable grooved cam of the drive-head mechanism.

Figure 17:
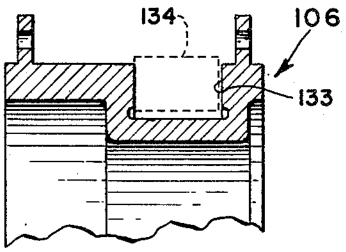

Fig. 17 is a sectional view looking in an upward direction of the forward grooved portion of the cam. This view is taken as on the dot and dash line 17—17 of Fig. 16 looking in the direction of the arrows.

Figure 18:
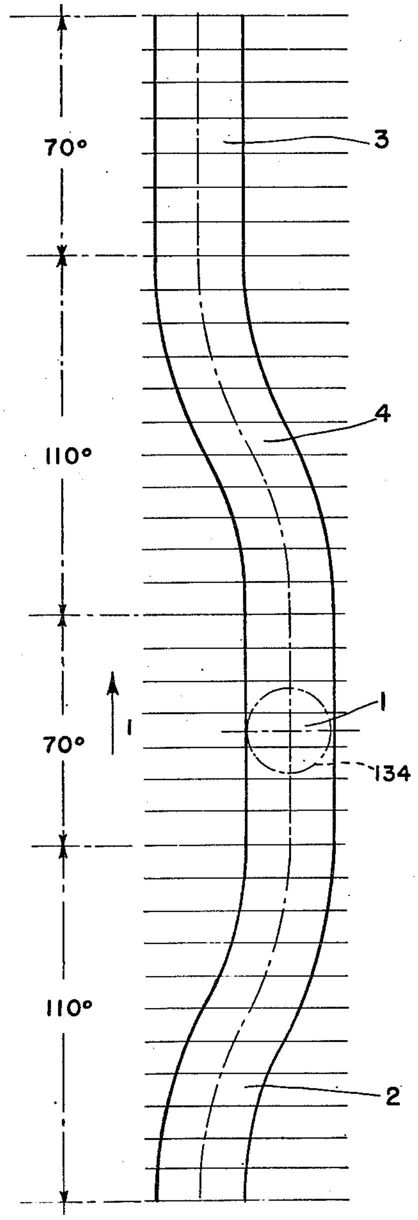

Fig. 18 is a development of the grooved portion of the cam of Fig. 16.

Figures 19, 20, 21:
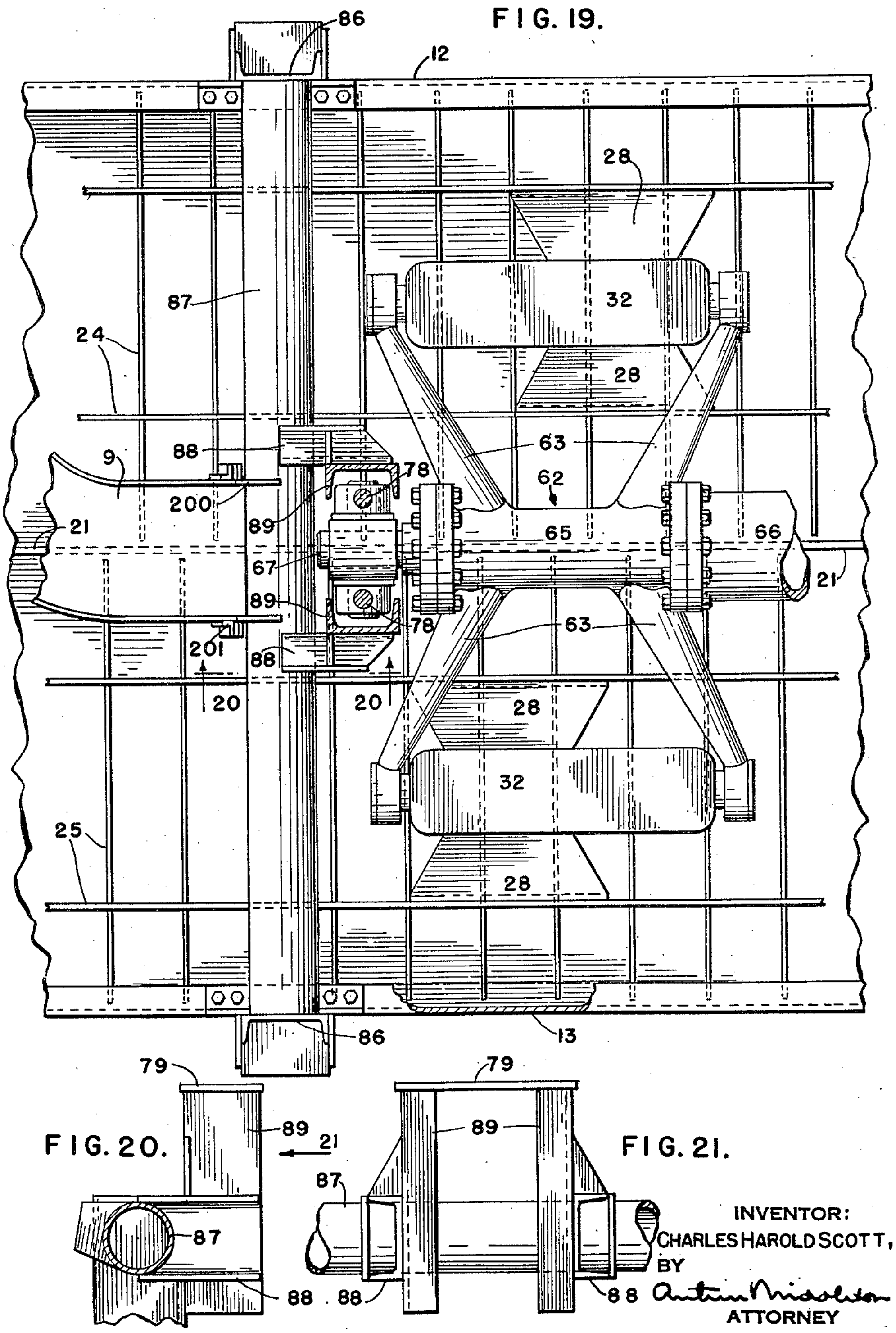

Fig. 19 is a partial plan view in the general vicinity of the rearmost portion of the rockable shaft.

Figs. 20 and 21 are vertical detailed views, Fig. 20 being a view taken as on a vertical longitudinal plane indicated by the dot and dash line 20—20 of Fig. 19 looking in the direction of the arrows, and Fig. 21 being an upright transverse view looking at the parts of Fig. 20 in the direction of the arrow 21.

Figures 22, 23:
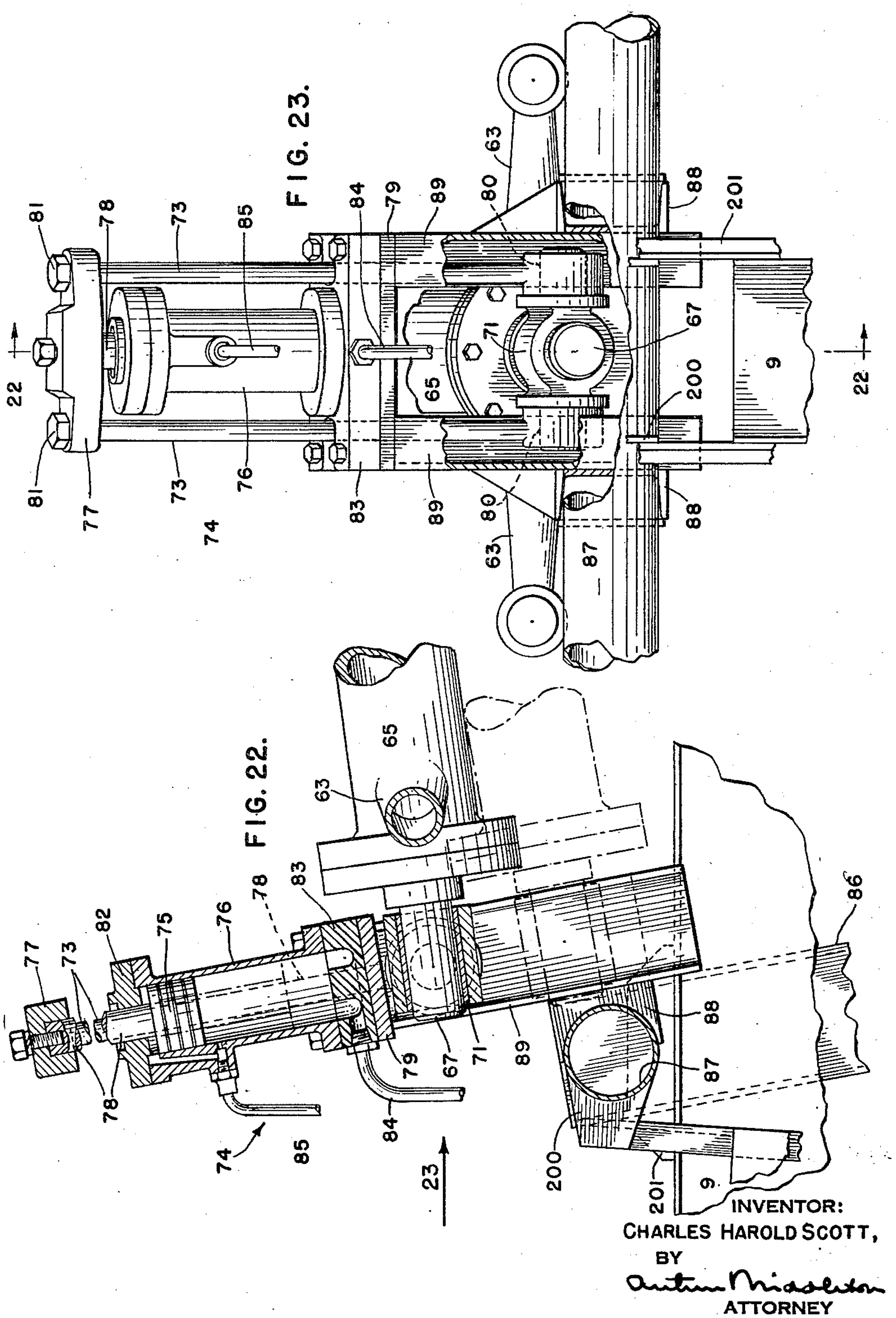

Figs. 22 and 23 respectively provide a vertical longitudinal view partially broken away and an upstanding rear view partially broken away of the liftable rear bearing and hydraulic mechanism for lifting the same and thereby the rear end of the rockable shaft, Fig. 22 being a view taken on a vertically and longitudinally extending plane indicated by the dot and dash line 22—22 of Fig. 23 looking in the direction of the arrows and Fig. 23 being an upright view looking forwardly at the structure of Fig. 22 and in the direction of arrow 23.

Figures 24, 25:
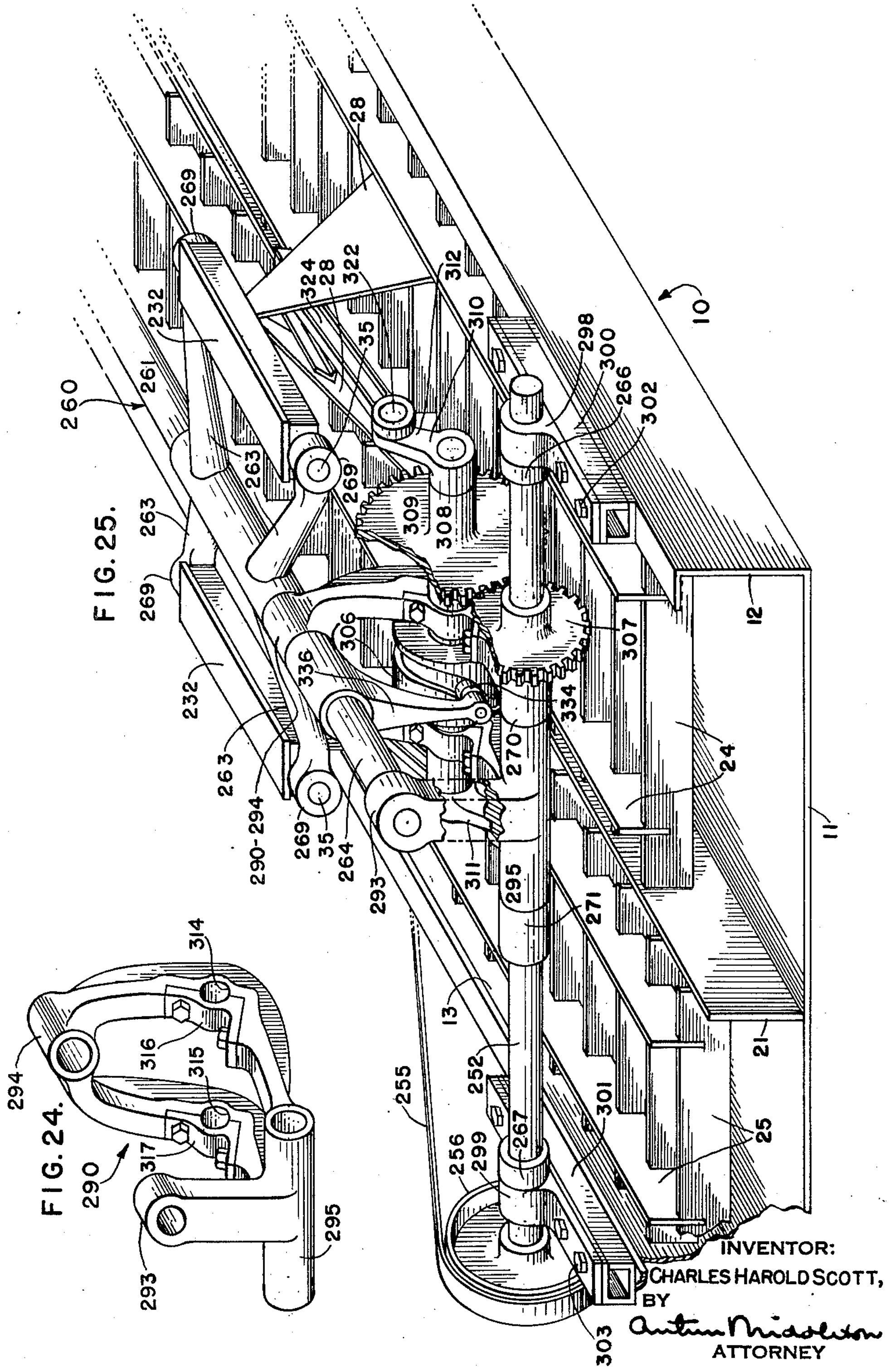

Fig. 24 is a perspective view of a housing or cage member employed in a modified form of drive-head mechanism shown in Fig. 25.

Fig. 25 is a perspective view of a modified form of drive-head mechanism.

Reference is now made to the drawings in detail:

The construction illustrated as embodying the invention hereof includes (1) a deep end tank having an upwardly inclined bottom or deck; (2) a pair of longitudinally-extending rake structures arranged side by side and provided with transverse raking blades; (3) a rocker of rigid construction embodying a rockable longitudinal shaft portion and rocker arms extending laterally in opposite directions from the shaft; (4) a longitudinally-extending slideway construction provided at and for the outer end of each rocker arm or set of rocker arms and having a longitudinal slidable member providing part of a depending carrier support for corresponding portion of a rake structure; (5) a front support bearing for the forward end of the rockable shaft provided in and by a housing constituting part of the drive-head mechanism next referred to; (6) a drive-head mechanism supported with respect to the front end of the tank so as to have slight angular movement about a transverse axial line and which embodies the housing structure as well as motivated means having a mechanical element for imparting spaced periodic rocking movement to the shaft and also mechanical elements for imparting spaced periodic longitudinal back and forth movements; (7) a liftable rear bearing member that receives and carries the rear end extension or lower support shaft of the rockable shaft 61; (8) a support for the elevating means hereinafter referred to; and (9) an elevating means carried by said support and provided for raising and lowering the liftable rear bearing member.

The several parts listed above will be described in detail under the respective headings designated therefor.

*Classifier tank*

The classifier tank is designated as 10; means as at 9 is provided for feeding and delivering into the tank a liquid-solids suspension or mixture of metallurgical pulp containing suspended solids to the classifier.

The tank 10 has a sloping bottom or inclined deck 11 from which there rise side walls 12 and 13 and at the deep end an end wall 14 in the form of a bent plate having a lower section 15 extending at right angles to the inclined deck and a vertically-extending section 16 providing an overflow edge 17 at elevation lower than that of the edge portions of the side walls and lower than that of the sands-discharge end or forward edge 18 of the inclined deck 11. The overflow edge 17 of the end wall serves as a weir determining the normal operative overflow elevation for liquid with suspended fine solids therein leaving the tank, and thereby determining the normal operative surface level for the liquid within the tank. An overflow receiving launder or outflow discharge means is provided at 19 from which liquid rid of heavy solids passes from the tank to the place of disposal. Raked or classified coarser solids or sands pass as relatively dewatered solids from the forward upper end of the inclined deck. The tank 10 can be made of sheet metal properly stiffened but it will be understood that it can be made of any suitable material depending upon the particular type of employment. There extends upwardly from and along the inclined deck a centrally located longitudinally-extending partitioning rib 21 whereby there are provided right and left trough-like receiving sections as 22 and 23 wherein alternate raking operations are carried out by respective rake structures 24 and 25.

*Rake structures*

Each set of rake structures includes sets of longitudinals or stringers as 26 and longitudinally spaced transverse raking blades as 27 that are fixedly secured to the longitudinals. These blades extend downwardly to regions below the set of longitudinals by which they are carried. Each rake structure has upwardly-extending from the longitudinal stringers carrier plates or hangers as 28 whereby there may be connected thereto depending tang portions 51 of a longitudinal slidable member of the longitudinal slideway construction 32 hereinafter referred to. In this connection reference is made to the slideway construction 32 as shown in Figs. 5 and 6 and to the detailed member shown in Fig. 7.

*Rocker construction*

Figures 3, 4:
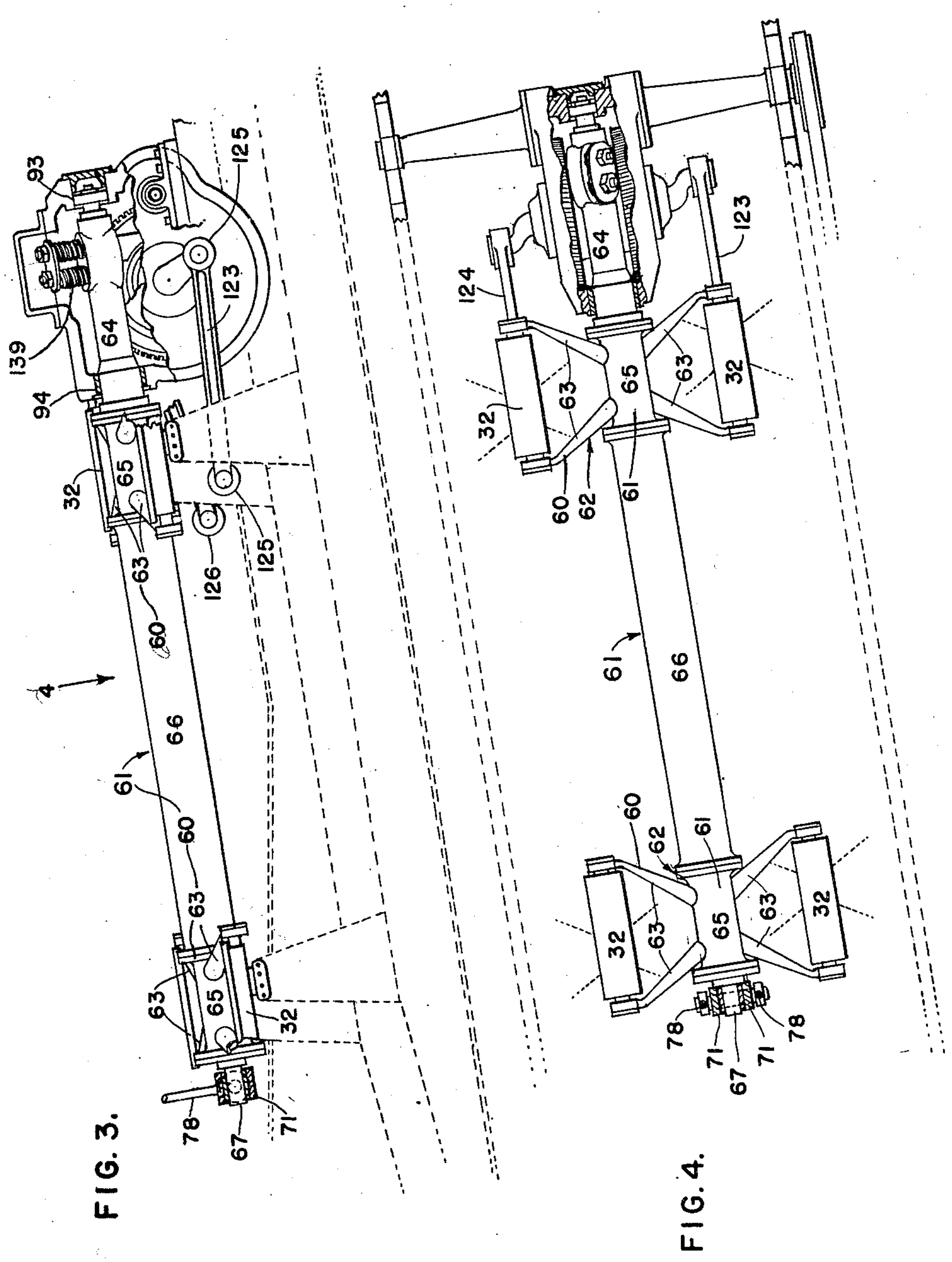
Fig. 3 is an elevational side view indicating by full lines the arrangement and embodiment of important novel features of construction by which rake structures indicated by dotted lines are coordinatedly raised or lowered or in timed relationship moved longitudinally in rearward or forward direction as the case may be.
Fig. 4 is a view looking downwardly at the construction of Fig. 3 in the direction of arrow 4.

The rocker construction is shown in Figs. 3 and 4 by full lines in a manner to indicate its functioning position with respect to rake structures indicated by dot and dash lines. Those figures can well be employed in conjunction with the slideway construction showing of Figs. 5 and 6 and the front end showing of Fig. 11. The showing of Figs. 3 and 4 are provided whereby certain novel features of a built-up rocker construction can be later forcibly brought out by reference thereto. This rocker construction is of rigid construction and includes longitudinally-spaced forwardly-disposed and rearwardly-disposed rocker arm members 62 each of which includes a shaft section 65 from which there extend in opposite directions fork-shaped sets of rocker arms 63—63. As constructed the tiltable rocker embodies a built-up shaft which includes in serial arrangement a supported front end shaft section 64, sometimes referred to as a pivot shaft, a first shaft-providing section 65 from which the rocker arms 63 extend, an intermediate tubular section 66, sometimes referred to as a torque tube, a second shaft-providing section 65, and lower support shaft 67, sometimes referred to as the rear shaft extension 67 which is supported in a rear rocker shaft bearing 71. This longitudinally-extending rocker or rockable shaft is collectively designated as 61 and from the laterally branching fork-shaped rocker arms 63—63, sometimes called cross-arms, there are supported through the medium of pivot members as 36 in the outer ends of the forked arms mentioned, the slideway hanger construction 32 of Figs. 5 and 6.

*Slideway hanger construction*

The slideway hanger construction constitutes an important feature of this invention as it was designed whereby an oscillant rigid arm rocker construction can be employed and whereby longitudinal reciprocating movements can be imparted to the rake structures in directions paralleling the longitudinal axis of the oscillant shaft, and it is therefore in order to describe this construction at this time. Said slideway hanger construction, thus generally designated as 32, constitutes a rake-carrying structure which is interposed between the outer ends of each pair of fork-shaped rocker arms 63 and a corresponding portion of the rake structure which is carried therefrom. The outer ends of the arms are bored so as to receive the pivot members 36 referred to and which pivot members in turn receive and through the medium thereof support apertured trunnions 35—35 of a longitudinally-extending body member 33 of the slideway hanger construction 32.

This slideway hanger construction 32 is shown in general arrangement and detail in Figs. 5 to 10 inclusive. It embodies the body member 33 just referred to. The body member has longitudinally apertured trunnions 35—35 which are mounted in the pivot members 36 provided to receive them. The openings in the trunnions are in alignment with openings provided in the pivot members 36. The body member 33 has a cross-head cover 47 detachably secured thereto as by bolts. Each body member 33 has parallel supporting guideways 40 upon which there are mounted longitudinally movable slidable members 41 that include shoe members 42 having underlying anti-friction bearing members 43 resting upon and slidably engaging guideways 40. The slidable member 41 also includes cross-head caps 45 topped by anti-friction guide blocks 46 disposed for engaging the underside of the cross-head cover 47. The slideway hanger construction has a cross-head member 48 (see Figs. 7 to 11) provided with lateral trunnions 50 mounted in the slidable members 41 so that a tang portion 51 of the member 48 depends from the trunnion supported portions 50—50 thereof. This cross-head member 48 has a body portion 49 from which the lateral trunnions 50 extend. These trunnions are received and maintained in circular bearings provided therefor by the shoes 42 and caps 45 thereof and which collectively constitute parts of the slidable members 41. The caps 45 are secured in place relative to the shoes 42 as by screws 44. The cross-head member 48 has its tang portion 51 extending from the trunnion supported body 49 thereof to a region below the body member 33 of the slideway construction. This depending tang 51 has a series of bolt-receiving openings 52 whereby the lower end of the tang can be clamped and fixedly secured as by bolts 53 to the upper ends of the upwardly and inwardly inclined carrier plates 28 of a portion of the rake structure. Filler or spacer pieces 29 indicated in Figs. 5 and 6 can be interposed between the depending tang portion on the one hand and the upwardly and inwardly inclined carrier plates on the other hand. Since each cross-head guide is mounted through the medium of the longitudinal apertured trunnions 35—35 there are provided means by which, as the rocker 61 is tilted about its inclined longitudinal axis in one direction, one of the rake structures is suspendingly supported in low position therefor for longitudinal forward movement as by the up-deck stroke while the other rake structure is suspendingly supported in raised position therefor for longitudinal rearward non-raking movement preparatory to subsequent lowering into low forward raking position.

According to this new form of slideway hanger construction 32 it will be noted that there is permitted a pivotal movement of the slideway construction about the trunnion axis mentioned as the rocker arms are swung up or down, as the case may be, and also there is provision for a limited relative pivotal movement as between the depending cross-head 48 and the slidable member 41 because the lateral trunnions 50 of the cross-head are mounted in circular bearings provided in and by the shoes 42 and the caps 45.

The slideway construction as employed has an upward and forward inclination in general longitudinal direction. Accordingly, one of the pivot members 36 is located at the high forward end thereof and the other pivot member is located at the low rear end thereof. To the forward pivot member there is secured and carried an upstanding oil cup 30 for supplying lubricant through the apertured trunnion of the body member 33 for lubricated slideway and the lower pivot member is provided with a depending oil receptacle 31 for receiving lubrication passing from the slideway construction through the apertured portion of the trunnion member whereby it can be collected in the latter receptacle. This oil receptacle is preferably provided with a valve-controlled discharge means leading therefrom. By the oil supply cup 30 and the depending oil receptacle 31 the movable elements of the slideway can be lubricated by the means of support therefor and can readily be maintained lubricated.

In the Figs. 5 and 6, there is also shown a wrist pin 55 carried in wrist pin supports 56. These wrist pin supports have cylindrical bearing members 57 for receiving the outer ends of the wrist pin and these bearing members 57 have welded thereto longitudinally-extending members 58 angle shaped in cross-section and secured to upwardly inclined rake hangers 28—28 as through the medium of bolts 59. The rear end 54 of one of the connecting rods 123 or 124, as the case may be, is mounted on the wrist pin 55 and as the apparatus functions the connecting rod imparts the forward or rearward longitudinal movement to the rake structure to which it corresponds.

*Drive-head mechanism*

Figures 12A, 12B, 12C:
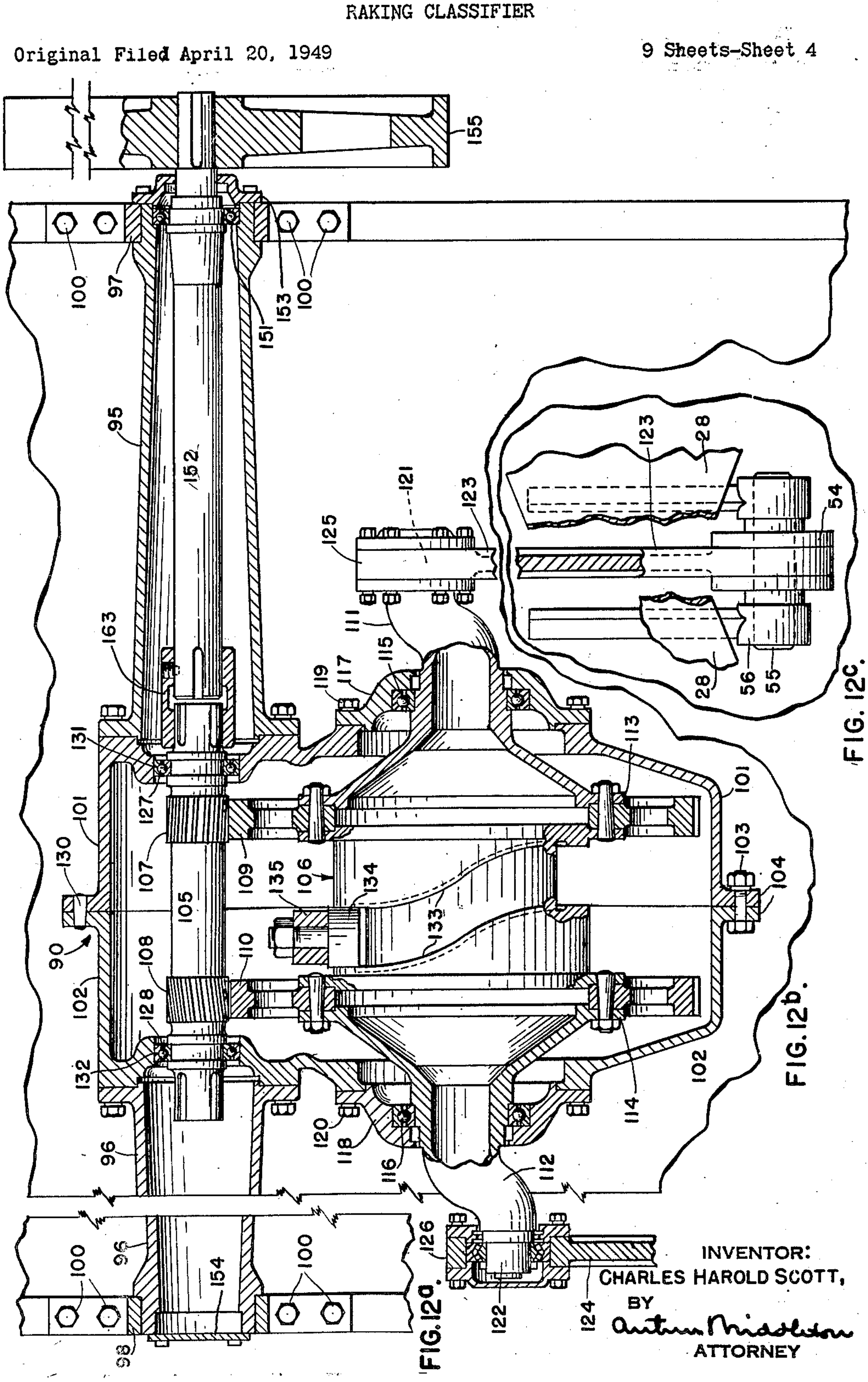

The drive-head mechanism or drive unit assembly, as it may be called, is illustrated by Figs. 12ª to 18 inclusive. Its use and place of employment is further exemplified by reference to Figs. 1 to 4 inclusive and also to Fig. 11. In this connection one should bear in mind that Fig. 11 is a view of the forward end of the classifier looking in a rearward direction and that the drive-head mechanism is in the foreground.

The important features and parts shown in the views of Figs. 12ª to 14 comprehend the gear housing or cage 90 embodying right and left side sections 101 and 102 connected into a gear casing unit by bolts 103 extending through flange portions 104—104 thereof.

This housing provides longitudinally aligned bearings 93 and 94, see Fig. 14, for receiving the pivot shaft 64 which functions as a front end section of the rocker shaft 61. In connection with the foregoing also see Figs. 3 and 4.

Support tubes 95 and 96 are secured to and extend from the housing sections 101 and 102. The support tubes 95 and 96 are in turn supported in aligned but transversely spaced pedestal bearings 97 and 98. The pedestal bearings 97 and 98 are in turn supported on the front end portion of the side walls of the tank through the medium of spacer blocks 99 and all are secured in place by bolts 100 (see Fig. 11). The pedestal bearings 97 and 98 establish a transversely- and horizontally-extending axial line about which the drive-head mechanism can have a limited angular movement and which angular movement is requisite when the rear end of the rocker parts carried thereby are to be lifted or raised.

The drive-head mechanism embodies gearing including (1) a motor actuated transverse pinion shaft 105 having thereupon pinions 107 and 108 which are gears of small diameter and preferably of the herringbone type; (2) large driven gears 109 and 110 are arranged so that the herringbone type of teeth thereof are in meshing driven engagement with the pinions or small gears 107 and 108; (3) a cylindrical cam 106 disposed between and connected to the large driven gears 109 and 110 so as to be concentric therewith; and (4) crank shafts 111 and 112 having flanged inner ends 113 and 114 connected to, concentric with and driven by the large gears 109 and 110; these shafts are turnably mounted within and extend outwardly through anti-friction bearings 115 and 116 provided in and carried by bearing rings 117 and 118 which are secured as by bolts 119 and 120 whereby to constitute part of the housing 90. The result of the construction just described is such that the crank pins 121 and 122 of the crank shafts 111 and 112 are located outside of the casing or housing 90. These crank pins are arranged 180° apart. The drive-head mechanism also actuates rearwardly-extending connecting rods 123 and 124 of which the forward ends 125 and 126 have driven connection with the crank pins 121 and 122 of the crank shafts 111 or 112, as the case may be, while the rear ends of the connecting rods (each rear end being designated 54) have driving connection to the rake structures through the medium of the respective wrist pins 55 mounted in the wrist pin supports 56 carried by the rake structures to which a particular connecting rod corresponds.

The crank shaft 111, the driven gear 109, the cylindrical cam 106, the driven gear 110 and the crank shaft 112 are thus serially arranged and are connected in transverse axial alignment into a composite rotary structure that is mounted for turning movement as imparted thereto by pinion gears 107 and 108 on the actuated drive pinion shaft 105, but so as to be restrained against any substantial play in transverse direction because of the construction of the anti-friction bearings 115 and 116 as supported in and carried by the transversely spaced crank shaft bearing rings 117 and 118 provided for receiving and holding the anti-friction bearings 115 and 116. Tapered pins 130 function as positioning members for assuring proper alignment of the side sections 101 and 102 as and when they are screwed together by the several bolts 103.

A requirement of the housing 90 is such that while it is supported for permitting slight angular movement thereto about a transverse axis as determined by the support tubes 95 and 96 which are mounted in the side or pedestal bearings 97 or 98, nevertheless, it must be of a rigid type of construction such that the axis of the crank shaft and the axis of the drive pinion shaft 105 will be parallel whereby proper tooth engagement will be realized as between the pinions 107 and 108 on the drive pinion shaft on the one hand and the teeth of the large drive gears 109 and 110 on the other hand.

With respect to the two small pinions 107 and 108 on pinion shaft 105 and the two large drive gears 109 and 110 of the composite assembly referred to, it will be noted that they are preferably provided as coordinatedly disposed sets of gears of herringbone type of construction whereby the right and left hand type of pinions 107 and 108 respectively mesh with left and right hand type of drive gears 109 and 110, thus assuring an arrangement in which there is attained a tendency for the set of gears and set of pinions to constantly remain in an arrangement according to which balanced driving of the large gears 109 and 110 from pinions 107 and 108 is attained and whereby there is avoided any tendency for substantial bodily movement in an axial direction of the pinion shaft 105 even though the anti-friction bearings 127 and 128 provided for the pinion shaft 105 are non-fixedly mounted in aligned openings 131 and 132 provided therefor in and by the housing sections 101 and 102.

It is in order to digress for the moment for the purpose of explaining that the drive pinion shaft 105 is actuated from a motor which is outside of the classifier through a speed reducing and power-transmission means 8 embodying belting 150 driven from the rotor of the motor and a shaft pulley 155 mounted on a shaft 152. (In this connection see Figs. 1, 11 and 12b). The shaft extends into the support tube 95 and is mounted in an anti-friction bearing 151 which in turn is internally mounted within the outer end portion of the support tube 95. The inner end of the shaft 152 is splined and there is a spline sleeve 163 that provides a drive connection between the inner splined end of shaft 152 and a splined end of pinion shaft 105.

The outer end portions of the support tube are provided with oil-sealing caps secured thereto, namely, there is a sealing cap 153 for the support tube 95 and sealing cap 154 for the support tube 96.

Reverting to the cylindrical cam 106, it will be noted that it has a grooved profile 133 for receiving a cam-actuated roller 134. This roller is turnably mounted at the low swinging end 135 of a roller-carrying arm 136 which forms a separable connection between the cam and the rockable shaft 61 and is carried at and yieldably secured to the pivot shaft 64 constituting a forward extension of the shaft 61. This cam roller-carrying arm 136 is normally firmly, although yieldably, seated against resisting portions 137—137 provided on the pivot shaft 64 at the underside thereof and the arm is normally held quite rigidly in place through the medium of a pair of eyebolt type of tension rods 138—138 continuously maintained under tension by compression springs 139—139 respectively surrounding the rods. These eyebolts pass upwardly through a portion of the pivot shaft. The lower ends of said springs rest in depressed seat portions 140—140 in the upper surface portion of the pivot shaft and the upper ends of said springs engage the under side of a spreading plate forming an upper spring seat member 141 that is held in spring compressing position by nuts 142—142 that are adjustably positioned on the upper portion of the tension rods referred to. The lower ends of these tension rods have eye-portions 143 for receiving a pin 144 which passes through a section 145 of the upper end of the roller-carrying arm 136. Depressed portions 146—146 at the upper end of this roller-carrying arm forcibly engage the resisting portions 137—137 at the underside of the pivot shaft. In the form shown the resisting portions 137—137 are provided by longitudinally-extending projections resembling parallel ribs with curved underfaces. These ribs are transversely spaced with respect to each other and the curved faces are received in the cooperatively depressed portions 146 just referred to.

In Fig. 13 the parts just referred to are shown in a position which the roller-carrying arm 136 normally occupies during non-overload operating condition.

In Fig. 15 there is shown a position typifying that which the roller-carrying arm can occupy relative to the pivot shaft should an abnormal overload or obstructing condition be encountered. This position indicates what is termed a "break" or yielded or separated position for the arm. As soon as overload operating conditions have been overcome the compression springs 139—139 force the separable roller-carrying arm 136 into normal position therefor.

There has already been indicated that the rocker 60 embodies the rockable shaft 61 and rocker arms 63 which are fixedly and rigidly connected as parts thereof. There has also been brought out how the rocker arms extend outwardly from the rockable shaft and therefore function periodically to raise and to lower the rake structure as required through the medium of longitudinal slideway constructions as 32 and also whereby because of the latter the rake structures are supported so as to be moved in forward and rearward directions as part of cyclic paths through which each rake structure travels during the successive operative movements thereof.

There has also been described the drive-head mechanism which comprises a cylindrical cam 106 that constitutes part of a driven rotary member which is coordinatedly disposed for actuating the roller of a roller-carrying arm that is connected to a forward end portion of the rockable shaft, namely, to the forward pivot shaft section 46 thereof whereby to impart the requisite rocking or oscillating movements to the rocker shaft.

There have also been mentioned crank shafts which have been described as constituting part of the rotary member whereby through the medium of connecting rods connected to the ends of the crank shafts and to the respective rake structures the latter can be moved back and forth in the proper manner one with respect to the other.

It is believed, however, that amplification of the description of the cylindrical cam 106 which has a peripheral groove of 360 angular degrees and this mode of operation for performing the work required of it can be further exemplified by reference to Figs. 16 to 18 inclusive hereof.

The cam 106 with its peripheral groove 133 is illustrated in Fig. 16 which is a view looking in a rearward direction at the cam. In this connection it will be noted that Fig. 17 is a horizontal sectional view of the peripheral portion of the cam taken on a plane indicated by the dot and dash line 17—17 looking in an upward direction indicated by the arrows, and that Fig. 18 shows a development of the grooved profile 133 of the cam.

As already pointed out and in connection with Figs. 12ª to 14 inclusive, it will be seen how the pivot shaft 64 constituting the front end of the rockable shaft 61, the roller-carrying arm 136 and the roller 134 at the lower end of the arm (which roller enters the groove 133 of the cam) cooperatively function and from the preceding description it will be apparent.

(a) When the roller 134 is in the dwell section 1 of 70 angular degrees of the profiled groove that the right rake structure is held in low forward raking position while being moved forwardly by the connecting rod provided between the outer end of the right crank shaft and the right rake structure;

(b) When the roller 134 is in the reverse curved roller actuating section 2 of 110 angular degrees of the profiled groove that the roller is then being actuated to swing the rockable shaft 61 so as to elevate the right rake structure and to lower the left rake structure;

(c) When the roller 134 is in the roller dwell section 3 of 70 angular degrees of the profiled groove that the left rake structure is then in its low forward raking position while being moved forwardly by the connecting rod provided between the outer end of the left crank shaft and the left rake structure; and (d) When the roller 134 is in the reverse curved roller actuated section 4 of 110 angular degrees of the profiled groove that the roller is then being actuated to swing the rocker shaft so as to elevate the left rake structure and to lower the right rake structure to low position for forward raking operation when and while the roller is in dwell section 1. Of course, it will be realized that when any one of the associated right and left rake structures is in low raking position and is being moved forward by a crank and connecting rod mechanism corresponding thereto, the other rake structure is being moved rearwardly in high return or non-raking position therefor.

*Liftable rear bearing member*

The bearing is provided for receiving and carrying the rear end extension 67 of the rocker shaft 61. This rear end extension is sometimes referred to as the low support shaft of the rocker. The liftable rear bearing 71 is indicated in Figs. 3 and 4. Its location with respect to the rear end of the rocker and other structure in the vicinity thereof and particularly with respect to supporting structure for the elevating means hereinafter described is clear from the showing in Figs. 21 to 25.

The liftable bearing 71 derives its entire support through the medium of the elevating means and the latter in turn derives its support from a stationary structure fixedly positioned with respect to the tank as will presently appear.

*Support for the elevating means*

Figures 1, 2A, 2B:
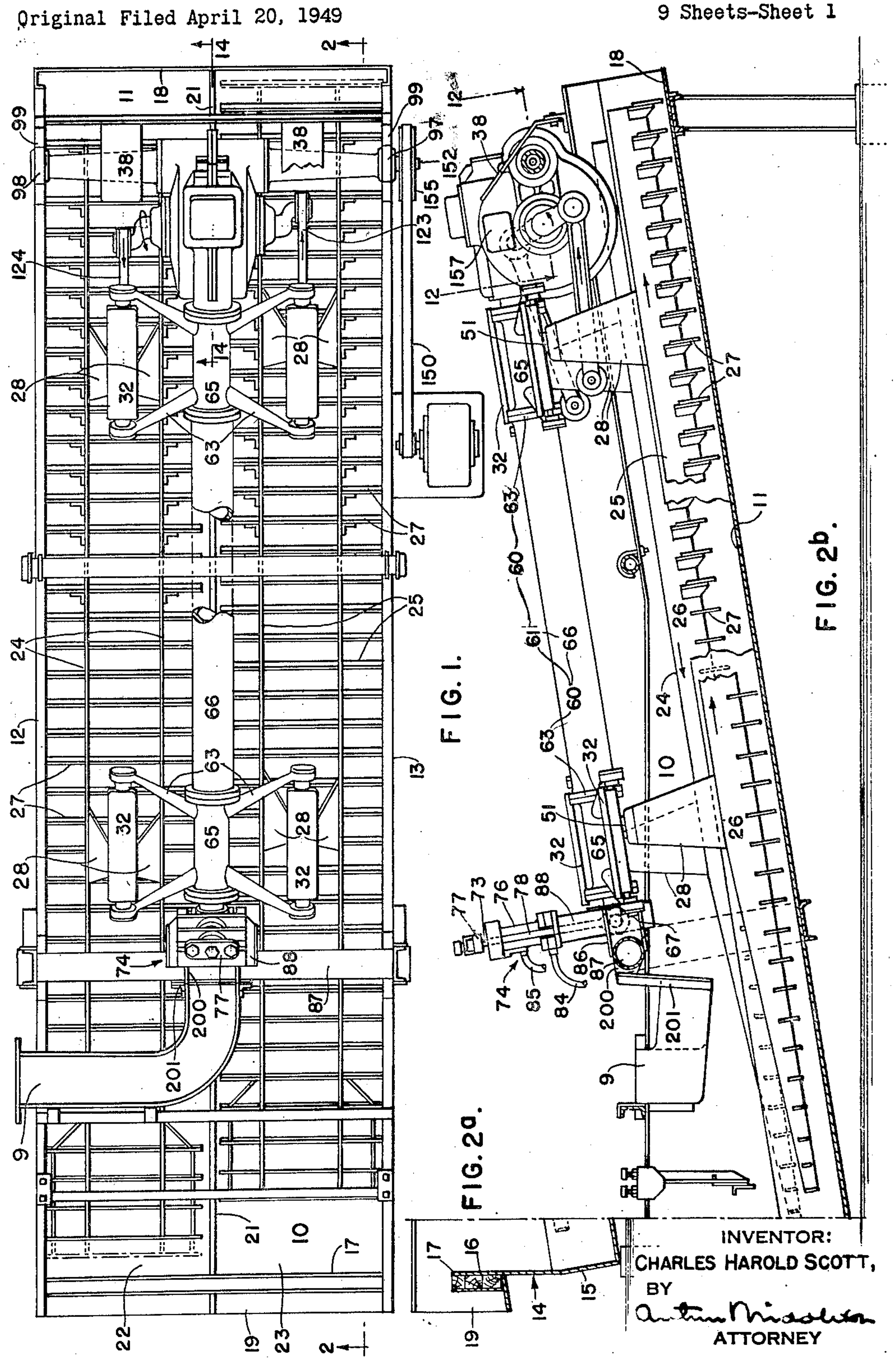

(For location see Figs. 1 and 2ᵇ and for details see Figs. 21 to 25)

The support for the elevating means is of a rigid construction and is afforded by a structure which includes upwardly-extending side members 86—86 fixedly positioned with respect to the tank, a transverse tubular carrier 87 connected as by welding to the upper ends of the side members 86—86, short transversely spaced forwardly-extending members 88 having a weld connection to the tubular member 87, an upper set of transversely spaced upwardly-extending members 89—89 which are secured to and rise from forwardly-extending portions of 88—88 and a horizontally- and transversely-extending top plate member 79 carried at and secured to the upper ends of members 89—89. The plate member 79 just referred to constitutes a table top upon which a base 83 of a cylinder of the expansible and contractible lifting means is fixedly secured in any suitable manner. The tubular cross-member 87 also carries a set of transversely spaced blades that provide rearward extensions 200 for supporting the set of depending members 201 which serve as means by which the forward end portion of the feed conduit 9 derives its support.

*Elevating means for rear bearing*

As to the means for raising or for lowering the elevatable rear bearing 71 for the rocker shaft 61, this is provided by a raising and lowering mechanism of a hydraulic type and is collectively designated 74 and is carried by the support structure just described. The hydraulic type of lifting means 74 referred to is typified by a construction embodying a liftable piston 75 located in a cylinder 76 in which a rising or upstanding piston rod 78 of the piston extends through a cap member 82 located at the upper end of the cylinder. The lower end of the cylinder 76 rests upon and is connected to the base 83 which provides a lower head for the cylinder. Pressure fluid for actuating the piston may be supplied from any suitable source of liquid supply as through the medium of pipes 84 and 85 because of flow-paths provided in or by the cylinder base 83, the cylinder 76 and the cylinder cap 82.

The liftable bearing 71 at and for the lower rear end shaft section 67 of rockable shaft 61, is supported from the liftable piston 75 through the medium of a liftable yoke or cross-head 77 carried on the upper end of the upstanding piston rod 78 of the piston 75, depending rods 73 of eyebolt formation of which the upper ends of the rods 73 are adjustably carried by nuts 81 resting upon the lifting yoke and of which the low eye portions of the rods 73 receive and support lateral trunnions 80 extending outwardly from the liftable bearing 71.

With respect to this rear bearing construction it is to be noted that there is preferably interposed a bushing between the rear end of the tiltable shaft and the supporting bearing 71 therefor. It will also be noted that the cylinder and piston with piston rod extending upwardly therefrom are disposed so that the centerline common thereto extends in upward direction approximately at right angles to the longitudinal axis of the rockable shaft when the latter is in its normal low position.

*General*

In apparatus of the type disclosed where parts thereof require lubrication, this may be accomplished either by oiling systems designed whereby to supply oil therefor from a central location or oiling means provided at and for oiling individual bearings.

In apparatus where cranks or other moving parts are exposed it is advisable to supply shielding means or guards to protect operators from injury. Therefore, for practical operation it is preferable to have such parts either enclosed or provided as by shield members.

In the preferred form the gearing mechanisms have been enclosed in the housing structure 90. Also in said preferred form there are indicated shield members 38—38 the location of which is shown in Figs. 1 and 2[b], namely, in the region immediately ahead of the crank shafts and the connecting rods which are connected thereto and driven therefrom.

The gear housing generally designated as 90 is constructed so as to provide inspection or access openings, as for example, for the housing side 101 there is normally sealed inspection opening 157 having a removable cover plate 159 and for housing side section 102 there is a normally sealed inspection opening 158 having a removable cover plate 160. Also at the top of the housing there is an access opening 161 normally closed by removable housing cap 162.

The gear housing 90 is split along a vertically- and longitudinally-extending plane. The side sections 101 and 102 thereof have shaft bearings that must be in proper alignment. The housing and gear thereof as made require that there be provision for ready, prompt and accurate assembling or re-assembling of the several parts embodied in the drive-head mechanism, as for example, to assure the proper alignment or location of the several shaft bearing parts relative to each other. To that end there have been provided a plurality of tapering pins as 130 which extend through contacting flanges of said side sections and which pins can be relied upon for properly locating and for maintaining in proper location one housing side section relative to the other prior to and during the pulling of said sections together by the several bolts 103. Tapering pins and bolts may also be employed where other bolt connected parts are to be assembled or reassembled.

In Figs. 24 and 25 their is illustrated that which may be considered as a perspective view of a form of classifier construction modified as to detail as compared with the preferred form of classifier already described. The modified form, however, embodies certain and in fact many of the important novel characteristics features of the preferred form.

The perspective view of Fig. 25 may be described as a view looking at the forward high end of the classifier in a direction slanting laterally rearwardly and downwardly towards the classifier. In this figure there is illustrated the forward or high sands-discharge end of the tank 10 having an upwardly sloping bottom 11 and side walls 12 and 13 extending upwardly therefrom. The tank has a centrally located partitioning rib 21 rising from the bottom. Rake structuers 24 and 25 are operatively disposed respectively in the spaces between the partitioning rib and the side walls of the tank. Each rake structure has upwardly- and inwardly-extending hanger members or carrier plates 28. These carrier plates are supported from the outer ends 269—269 of forked arms 263 of the rocker construction 260 through the medium of slideway hanger constructions 232 corresponding to the slideway hanger constructions 32 previously described. In this connection it will also be noted that the slideway hanger constructions 32 have trunnions 35 at the ends thereof mounted in openings provided at and in the outer ends 269—269 of said arms whereby the slideway hanger constructions can have slight angular movement with respect to a longitudinal axis as the rake structures are raised or lowered because of a tilting movement imparted to the rocker construction.

The rocker construction 260 includes a longitudinally-extending shaft 261 providing a front end section or pintle shaft 264 that is mounted in bearings 293 and 294 of a cage or skeleton housing 290. This housing has a transversely-extending supported bearing portion 295 which is mounted on and so as to have a slight bodily pivotal movement imparted thereto about a transversely-extending motor driven shaft 252 which in turn is mounted in pedestal bearings 298 and 299. This motor driven shaft 252 is actuated from a motor, not shown, through the medium of a speed-reducing and power transmission mechanism embodying a belt 255 operable for driving a large pulley 256 secured in place to a portion of the shaft that extends into a region outside of the tank. The pedestal bearings 298 and 299 rest upon spacer blocks 300 and 301 which are supported on top flange portions of the corresponding sides 12 and 13 of the tank. The pedestal bearings and spacer blocks are secured in place on the flange portions of the tank as by bolts 302 and 303.

The transverse shaft 252 functions not only to support the cage or housing 290, but also as a drive shaft to which there is secured a small drive pinion 307 which in turn is provided for imparting turning movement to a large driven gear 309. This large driven gear 309 constitutes part of a composite driven rotary unit 308 which embodies in serial arrangement crank shaft 310 at one end thereof, the large driven gear 309, the cylindrical cam 306 and a crank shaft 311 at the other end thereof, and all of which are connected in axial alignment. The crank shafts 310 and 311 have at the outer ends thereof crank arms as 312 from which laterally extend crank pins 322 at the outer ends thereof. These crank shafts are assembled in the composite rotary unit in a manner whereby the crank arms thereof are at 180 degrees relative to each other.

The skeleton housing 290 has bearing portions 314 and 315 for receiving the crank shafts of the rotary unit 308 and also employs bearings caps as 316 and 317 which are detachably secured in place and which serve to maintain the rotary unit 308 in operative position.

The rotary unit 308 is so mounted in the skeleton housing so as to prevent any substantial play of the unit with respect to the housing in directions parallel to the motor driven shaft 252.

Also in connection with the foregoing, it will be noted that there are provided collars 266 and 267 disposed adjacent the pedestal bearings 298 and 299 and so secured to the shaft 252 as to prevent any substantial play of said shaft in said bearings in a direction in which the shaft extends. Likewise, collars 270 and 271 are located on and secured to the shaft 252 and are so disposed with respect to the bearing portion 295 of the skeleton housing whereby to prevent any substantial play or movement of said cage or housing 290 in direction parallel to the shaft 252.

It has heretofore been pointed out how the rocker construction generally designated as 260 embodies the oscillable longitudinally-extending shaft 261 from which there extends the set of fork-shaped arms 263, namely, in directions as to the right and to the left from the shaft 261 and which are so connected to the rocker shaft so as to move therewith when it is rocked.

It is also to be noted that in the structure as illustrated connecting rods as 324 are actuated from the crank pins 322 of the crank shaft and that they are also essentially connected in suitable manner as through a wrist pin, or the equivalent, to the upwardly- and inwardly-inclined carrier plates 28 by and from which the rake structures are supported from the longitudinally-extending slideway construction 232. It will be noted that the drive pinion 307 meshes with and imparts turning movement to the driven gear 309 of the composite construction whereby when said driven gear 309 turns there is imparted turning movement to both the cam on the one hand and the associated crank shafts 310 on the other hand. The cam 306 has a profiled groove portion which embodies the structural and functional characteristics of the cam 306 of the preferred form. In the modified form under consideration there is a cam actuated roller 334 which is disposed within the profiled groove portion of the cam 306. A roller-carrying arm 336 is connected to the shaft 264 so that as the cam turns, it functions to impart in periodic order through the medium of the cam actuated roller 334 and the roller-carrying arm 336, the requisite movements to the shaft 264 and thereby to the rocker construction 260. The cam 306 is functionally positioned with respect to the roller 334 and the roller-carrying arm 336 on the one hand and to the crank shafts 310 and 311 on the other hand whereby there is obtained the coordinated raising and lowering movement of the rake structures by the rocker construction as it is actuated and whereby the rake structures are longitudinally moved in proper timed manner requisite for their proper operative movements. Also in connection with the modified form of Fig. 25 it will be apparent that the rocker construction 260 and the longitudinal shaft 261 thereof—each of which is shown only as to the forward portion thereof—can be provided with supporting and lifting means at the rear end thereof by the construction employed and shown with respect to the preferred form as already described.

This application is a continuation of my patent application Serial No. 88,619, filed April 20, 1949, now abandoned.

The embodiments of the invention in which an exclusive property or privilege is claimed, are defined as follows.

I claim:

1. In a classifier having a tank with a sloping bottom for holding a bath of suspended solids to be classified with a pair of balanced parallel complementally reciprocable longitudinal rake structures having hangers for operating submergedly in the bath and with a rockable longitudinal shaft from which the rake structures derive support; characterized by rigidly fixed arms on the shaft superposed above each rake structure; elongated support means for reciprocably supporting each hanger of the rake structure from the fixed arms on the corresponding side of the shaft, and motivating means connected to at least one hanger of each rake structure for its reciprocation irrespective of the rocked position of the shaft and to the shaft for rocking it in timed relation to the reciprocating rake structure, one of said elongated support means being held by each fixed arm and each support means including a longitudinal track member and a member slidable thereon with both members parallel to the tank bottom.

2. Apparatus according to claim 1, wherein the application of the motivated means for the rake structures includes a crank for each rake structure and drivingly connected to the rake structure to which it corresponds.

3. Apparatus according to claim 1, wherein the application of the motivated means to the shaft includes a grooved cam.

4. A classifier according to claim 1, with the addition of means for pivotally mounting one end portion of the shaft for limited movement about a transverse pivotal axis so that if the end portion of the shaft is vertically moved the shaft carries with it the rake structures and certain actuated members of the motivated means.

5. A classifier according to claim 1, with the addition of means for pivotally mounting a front end portion of the shaft for movement about a horizontal transverse pivotal axis and means for raising the rear end portion of the shaft and consequently moving therewith rake structure supported therefrom.

6. A classifier according to claim 1, with the addition of means providing a housing having a longitudinal bearing for receiving and supporting a front end portion of the rockable shaft, means for pivotally supporting said housing for limited movement about a longitudinal transverse axis radially spaced below the axis of said rockable shaft, and means for lifting a rear end of the shaft and consequently the ends of the rake structures from a normal operative position therefor relative to the classifier bottom.

7. A classifier according to claim 1, having a housing providing a bearing for receiving a forward end portion of the rockable shaft, means for supporting said housing with respect to the tank and for permitting positionable movement of the housing about a transverse axial line, a motivated means embodying in coordinated arrangement a cam and a set of right and left cranks and turnably supported in bearings by said housing with an arm extending laterally from said rockable shaft and actuated by said cam and crank actuated means for each crank and in turn connected for imparting proper longitudinal movements to rake structures corresponding thereto in a manner whereby there is obtained coordinated timed relationship of the rocked position of the shaft and the reciprocative movement of the rake structures.

8. A classifier having a tank with a sloping bottom for holding a bath of suspended solids to be classified while supported thereover longitudinally of the tank is a pair of balanced complementally-reciprocable rake structures having hangers supported from a rockable shaft placed longitudinally of the tank whereby when the shaft rocks the rake structures rock with it, the improvement which comprises in combination rigidly fixed arms extending from each side of the shaft with one arm for each hanger, motor-driven means for simultaneously and independently applying in coordinated time relation rocking motion to the shaft and reciprocating motion to the rake structures although in opposite balanced directions, and means between each arm and its adjacent hanger for slidably and reciprocably supporting each hanger from the arm from which it derives support.

9. A classifier having an inclined bottom tank for holding a bath of suspended solids to be classified into one fraction of suspended fine solids overflowed from the deep end of the tank and one fraction of coarse solids emerged from the bath at the shallow end of the tank; a pair of balanced complementally - reciprocable bladed rake-structures having hangers; a rockable shaft placed longitudinally of the tank; and improved means for operating the rake-structures to stimulate such classification by moving submergedly each rake-structure forwardly along the incline of the tank in a sedimented-solids-raking stroke, then away from the bottom whereby raked solids from which the rake-structure so departs can slip down along the bottom, then rearwardly in an elevated liquid-agitating non-raking stroke, and finally toward the bottom to penetrate the layer of solids slipping down the incline of the bottom; which means comprise arms extending from each side of the shaft with one for each hanger, motivating means having dual connections of which one reciprocates the rake-structures and the other rocks the shaft in timed relation with the reciprocation of the rake-structures, and longitudinally slidable support means paralleling the shaft while located between each arm and its dependent hanger.

10. A classifier according to claim 9, wherein the arms have a main body portion parallel to the shaft and two-body-supporting connections extending generally laterally from the shaft and from the body portion.

11. A classifier according to claim 9, wherein the slidable support means include a track supported from each arm upon which slides the respective hanger for that arm.

12. A classifier according to claim 9, wherein the arms have a main body portion parallel to the shaft and two body-supporting connections extending generally laterally from the shaft and from the body portion; and wherein the slidable support means include a track supported from the two body-supporting connections of each arm upon which track slides the respective hanger supported from that arm.

13. A classifier having an inclined bottomed tank for holding a bath of suspended solids to be classified by hingered settlings into one fraction of suspended fine solids overflowed from the deep end of the tank and one fraction of coarse solids emerged from the shallow end of the tank; a pair of balanced complementally-reciprocable bladed rake-structures having hangers; a rockable shaft placed longitudinally of the tank; and improved means for submergedly moving each rake-structure along a cyclic path that is substantially of oblong shape with the long sides parallel the tank bottom and the short sides extending toward and away from the tank bottom; which means comprises arms extending from each side of the rockable shaft with one for each hanger, longitudinally slidable support means for each hanger between the hanger and its arm, motivating means, connections between the motivating means and a hanger of each rake-structure for reciprocating the rake-structures through the long sides of the path, and another connection between the motivating means and the rockable shaft for moving the shaft together with its arms and the hangers of the rake-structure through the short sides of the path.

14. A classifier having an inclined bottomed tank with a deep end and a shallow end for holding a bath of suspended solids to be classified; a pair of balanced complementally-reciprocable bladed rake-structures; a rockable shaft placed longitudinally of the tank from which the rake-structures are supported; and improved means for submergedly moving each rake-structure along a cyclic path that is substantially of oblong shape with the long sides parallel the tank bottom and the short sides extending toward and away from the tank bottom having a transversely extending housing at the shallow end of the tank for supporting an end section of the rockable shaft, a rotatable member in the housing, a crank carried by each end section of the rotatable member but with the cranks diametrically spaced apart rotationally, connecting rod means connecting each crank with one rake-structure whereby the rake-structures are moved along the long sides of their path, and means for moving the rake-structures along the short sides of their path comprising a groove-bearing cam on the rotatable member, a roller-carrying arm supported from the rockable shaft engaging the cam-groove with that groove having two arm-dwelling sections interspersed between two arm-moving sections.

15. A classifier according to claim 14, wherein the roller-carrying arm has means between it and its rockable shaft that are normally non-yielding but which are yielding upon excessive load pressures being transmitted therethrough to the rockable shaft.

16. A classifier according to claim 14, wherein the roller-carrying arm is normally maintained in rockable shaft actuating position by means of spring-forced rods but which springs are constructed to yield upon imposition thereon of overload strains imparted thereto from the rockable shaft.

17. A classifier according to claim 14, wherein the housing is supported from the tank by housing-tilting means tiltable about an axis that is lower than the axis of the rockable shaft.

18. A classifier according to claim 14, wherein the housing is supported from the tank by housing-tilting means tiltable about an axis that is lower than the axis of the rockable shaft, and at the other end of the tank there is a support for the rockable shaft that is raisable and lowerable.

19. A classifier according to claim 14, wherein the axis about which the cranks rotate is lower than the axis of the rockable shaft.

20. A classifier according to claim 14, wherein the housing is supported from the tank by housing-tilting means tiltable about an axis that is lower than the axis of the rockable shaft as well as lower than the axis about which the cranks rotate.

21. A classifier according to claim 14, wherein the cam is cylindrical with a roller-actuating groove of 360 degrees along its marginal surface and has means for actuating it comprising a driven gear secured thereto at each end thereof with one crank being supported from each gear.

22. A classifier according to claim 14, wherein the housing comprises a closed casing supporting the cam and cranks, and tubular means for tiltably supporting the casing from the sides of the tank at an elevation lower than the axis of the rockable shaft.

23. A classifier according to claim 14, wherein the housing comprises a closed casing supporting the rotatable member that carries the cranks and the cam, driven gears associated with the cam, support tube means tiltable supporting the casing from the tank, a driven shaft in at least one of the tubes, and gears on the shaft for driving the gears associated with the cam.

CHARLES HAROLD SCOTT.

References Cited in the file of this patent

UNITED STATES PATENTS

| Number | Name | Date |
|---|---|---|
| 2,437,760 | Scott et al. | Mar. 16, 1948 |